(12) United States Patent
Nielsen et al.

(10) Patent No.: US 10,040,902 B2
(45) Date of Patent: *Aug. 7, 2018

(54) POLYMERIC PHOTOINITIATORS

(71) Applicant: Coloplast A/S, Humlebaek (DK)

(72) Inventors: Christian B. Nielsen, Dragoer (DK); Niels Joergen Madsen, Alleroed (DK); Christina Maj Joergensen, Hilleroed (DK)

(73) Assignee: Coloplast A/S, Humlebaek (DK)

( * ) Notice: Subject to any disclaimer, the term of this patent is extended or adjusted under 35 U.S.C. 154(b) by 172 days.

This patent is subject to a terminal disclaimer.

(21) Appl. No.: 14/854,053

(22) Filed: Sep. 15, 2015

(65) Prior Publication Data

US 2016/0002400 A1 Jan. 7, 2016

Related U.S. Application Data

(63) Continuation of application No. 13/575,689, filed as application No. PCT/DK2011/050055 on Feb. 23, 2011, now Pat. No. 9,175,098.

(30) Foreign Application Priority Data

Feb. 23, 2010 (DK) .............................. 2010 70065
Jan. 7, 2011 (DK) .............................. 2011 70007

(51) Int. Cl.
*C08G 65/22* (2006.01)
*C08F 2/50* (2006.01)

(52) U.S. Cl.
CPC ............. *C08G 65/22* (2013.01); *C08F 2/50* (2013.01)

(58) Field of Classification Search
CPC ..... C08J 3/28; C08L 71/00; C08F 8/00; C08F 2/50; C08G 65/22
See application file for complete search history.

(56) References Cited

U.S. PATENT DOCUMENTS

| 3,484,239 | A | * | 12/1969 | Erdmann | ............... C08G 65/06 430/280.1 |
| 5,263,992 | A | | 11/1993 | Guire | |
| 8,841,354 | B2 | * | 9/2014 | Nielsen | ................. A61L 29/085 520/1 |
| 9,212,266 | B2 | * | 12/2015 | Nielsen | ................. A61L 29/085 |
| 2005/0192370 | A1 | | 9/2005 | Fansler et al. | |

FOREIGN PATENT DOCUMENTS

| DE | 10238559 A1 | 3/2004 |
| EP | 0769306 A2 | 4/1997 |
| JP | 2006504451 T2 | 2/2006 |
| JP | 2007525589 T2 | 9/2007 |
| JP | 2008522670 T2 | 7/2008 |

(Continued)

*Primary Examiner* — Nicholas E Hill
(74) *Attorney, Agent, or Firm* — Coloplast Corp., Coloplast A/S; Nick Baumann (57) ABSTRACT

A polyalkylether photoinitiator of the general formula I, $R_1(A_1)_r\text{-}(R_2(A_2)_m\text{-}O)_o\text{-}(R_3(A_3)_n\text{-}O)_p\text{-}R_4(A_4)_s$ I, wherein $R_1$, $R_2$, $R_3$, $R_4$ and m, n, o, p, r and s are as defined herein and $A_1$, $A_2$, $A_3$ and $A_4$ are identical or different photoinitiator moieties.

20 Claims, 4 Drawing Sheets

(56) References Cited

FOREIGN PATENT DOCUMENTS

| | | | |
|---|---:|---|---|
| JP | 2009514674 | T2 | 4/2009 |
| RU | 2341539 | C2 | 12/2008 |
| SU | 1729284 | A3 | 4/1992 |
| WO | 8602087 | A1 | 4/1986 |
| WO | 2006063181 | A1 | 6/2006 |
| WO | 07056338 | A2 | 5/2007 |

* cited by examiner

POLYMERIC PHOTOINITIATORS

FIELD OF THE INVENTION

The present invention relates to novel polymeric photoinitiators as well as to applications thereof and methods of producing polymeric photoinitiators, with polyalkylethers as an integral part of the polymeric system. Photoinitiator moieties are present as pendant groups on a polymeric backbone.

BACKGROUND OF THE INVENTION

Curing of coatings through ultraviolet (UV) radiation requires efficient methods of initiating the chemical reaction responsible for the curing process. Cross-linking of polymeric material through generation of radical species upon irradiation with UV light is widely used to produce hydrogels for medical device coatings. Also, the paint and lacquer industry makes use of UV initiated curing of acrylates, where photoinitiators in many cases are employed. These two examples illustrate the diversity of UV curable coatings, where up until now the UV active component in the coating recipe relies on molecules with comparable low molecular weight. The UV active components are partially free to diffuse to the surface of the cured material thereby rendering these substances exposed to the environment. Higher molecular weight photoinitiators, in particular polymeric photoinitiators, have comparably higher intrinsic viscosities which most likely result in longer diffusion times through a matrix. Migration of the UV active substances to the surface is therefore diminished when polymeric photoinitiators are used as opposed to lower molecular weight photoinitiators. Scarce literature found in scientific and patent publications within the topic of polymeric photoinitiators suggests that development of such polymers could lead to novel applications and present solutions for existing needs, such as provide a material with negligent migration of substances to the surface. Available literature discussed in the following, outlines previous work within the field of polymeric photoinitiators, with focus on work relevant for photoinitiators with a polyalkylether backbone.

Some descriptions of polymeric photoinitiators are found in scientific literature, where for example 4-amino-4'-[4-aminothiophenyl]benzophenone is polymerized with toluene-2,4-diisocyanate (J. Wei, H. Wang, J. Yin *J. Polym. Sci., Part A: Polym. Chem.,* 45 (2007), 576-587; J. Wei, H. Wang, X. Jiang, J. Yin, *Macromolecules,* 40 (2007), 2344-2351). Examples of the use of this photoinitiator to polymerize acrylates are also given in this work. A similar strategy is also discussed in J. Wei, F. Liu *Macromolecules,* 42 (2009), 5486-5491, where 4-[(4-maleimido)thiophenyl]benzophenone was synthesized and polymerized into a macromolecular photoinitiator.

A variety of polymeric photoinitiators other than benzophenone based structures are discussed in T. Corrales, F. Catalina, C. Peinado, N. S. Allen *J. Polym. Sci., Part A: Polym. Chem.,* 159 (2003), 103-114. Polymers with thioxanthone, benzil, anthraquionone, camphorquinone, benzoin ether, acylphosphine oxide and silane functionalites in the macromolecules are discussed in terms of efficiency in comparison to low molecular weight analogues. In some examples, the photoinitiation activity of the polymeric photoinitiator was one order of magnitude higher than the mixture of the corresponding low molecular weight analogues. This increase in activity in the particular case was ascribed to efficient excitation energy transfer between different moieties present on the polymer chain. One other explanation could be the prevention of recombination of radicals formed on the photoinitiator sites as the initiators are "tied" onto a polymer chain.

Some patent literature discusses polymeric photoinitiators. One example is found in US 2007/0078246 where different aromatic ketone systems are substituted on a siloxane polymeric chain. Rates of photopolymerization reactions are then used to prove an enhanced performance of the polymeric photoinitiators as opposed to low molecular weight analogues.

As a further example, benzophenone derivatives with pendant alkyl ether substitutents have been described in WO 96/33156, but the primary properties described were related to migration of the photoinitiators to the surface of a coating. The benzophenones are not repeating units in the polymer and the polymers described in WO 96/33156 can be considered end-functionalized with benzophenone moieties.

A related type of photoinitiator class is described in WO 2009/060235, where thioxanthone moieties are attached to an oligomeric backbone. It is particularly specified that the thioxanthone polymeric photoinitiators have molecular weights below 2000 g/mol.

Several photoinitiators (e.g. benzophenone, anthraquinone) with pendant polyalkyl ethers are described in WO 97/49664. Common to these photoinitiators is that the polyethylene glycol moieties attached to the photoinitiators have preferred molecular weights in the range of 150 to 900 Da and furthermore only one photoinitiator moiety is present per polymeric photoinitiator.

Related to the photoinitiators described in WO 96/33156, similar structures are described in WO 98/51759 where benzophenone derivatives with pendant alkyl ether groups are presented. The main focus of the invention described in WO 98/51759 is oxygen inhibition and low migration properties of the photoinitiator.

WO 03/033492 discloses thioxanthone derivatives attached to a polyhydroxy residue. However, these polyhydroxy groups have only up to 6 hydroxy groups present in the chain.

As a final example of polymeric photoinitiators described in the patent literature, U.S. Pat. No. 4,602,097 details an invention related to water soluble photoinitiators where two photoinitiator moieties are bridged together by a polyalkylether of sufficient length to make it water soluble.

Common to all of the inventions described above from the patent literature, is that the active photoinitiator sites are present as end-groups on for example a polyethylene glycol which falls outside the present invention. The present invention details polymeric photoinitiators in which the photoinitiator moiety itself is an integral part of the repeating unit in the polymeric photoinitiator.

OBJECT OF THE INVENTION

It is an object of embodiments of the present invention to provide novel polymeric photoinitiators as well as to provide means and methods for their production. The invention also provides a method for curing a matrix composition and a cured matrix composition obtainable via said method.

SUMMARY OF THE INVENTION

Figure 1:
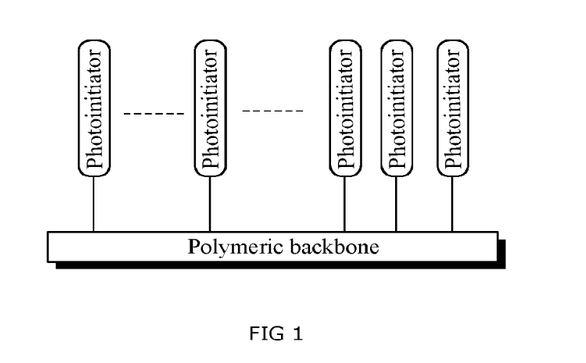
FIG. 1 illustrates a general motif of polymeric photoinitiators, with photoinitiator moieties pendant on a polyalkylether.
Figure 2:
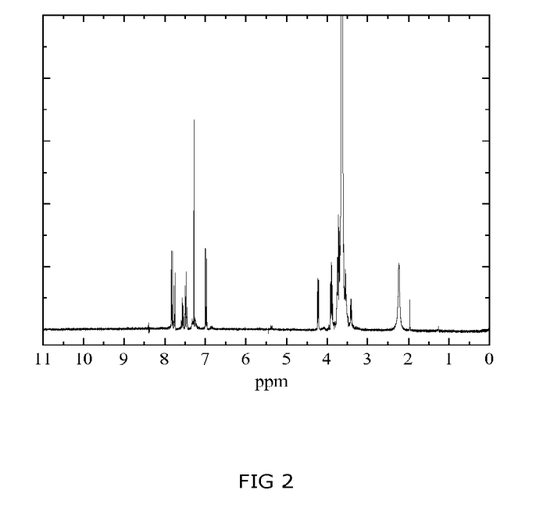
FIG. 2 shows the $^1$H-NMR spectrum of poly-co-ethyleneoxid-(4-(oxiran-2-ylmethoxy)phenyl)(phenyl)methanone using the polymerization procedure given for 1.
Figure 3:
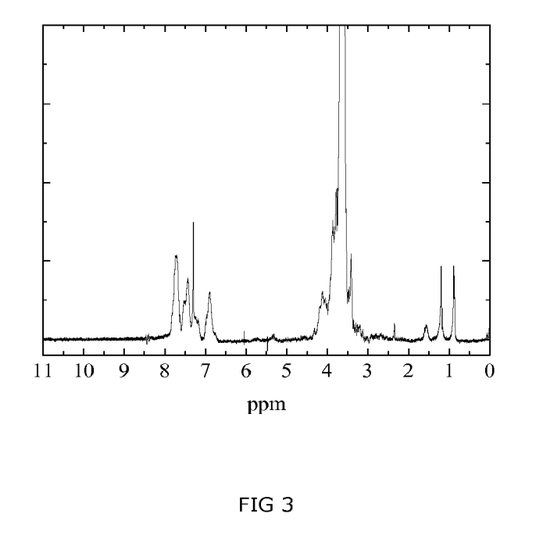
FIG. 3 shows the $^1$H-NMR spectrum of poly-co-ethyleneoxid-(4-(oxiran-2-ylmethoxy)phenyl)(phenyl)methanone using the polymerization procedure given for 2.

One aspect of the present invention is to provide access to polymeric photoinitiators with the general motif shown in FIG. 1, in particular systems with a polyalkylether as the backbone polymer on which pendant photoinitiators moieties are covalently attached.

So, in a broad aspect, the present invention relates to a polyalkylether photoinitiator of the general formula I $$R_1(A_1)_r\text{-}(R_2(A_2)_m\text{-}O)_o\text{---}(R_3(A_3)_n\text{-}O)_p\text{---}R_4(A_4)_s \qquad \text{I}$$

wherein $R_2$ and $R_3$ are independently at each occurrence identical or different, linear or branched alkylene or cycloalkylene groups; wherein $R_2$ and $R_3$ may be substituted with one or more substituents selected from CN; azides; esters; ethers; amides; halogen atoms; sulfones; sulfonic derivatives; $NH_2$ or $Nalk_2$, where alk is any $C_1$-$C_8$ straight chain alkyl group, $C_3$-$C_8$ branched or cyclic alkyl group; $R_1$ and $R_4$ are independently at each occurrence identical or different, linear or branched alkyl or cycloalkyl groups or aryl groups or are independently at each occurrence selected from H, OH, CN, halogens, amines (e.g. —NR'R", where R' and R" are alkyl groups, suitably C1-C25 alkyl groups), amides (e.g. —CONR'R" or R'CONR"—, where R' and R" are alkyl groups, suitably C1-C25 alkyl groups), alcohols, ethers, thioethers, sulfones and derivatives thereof, sulfonic acid and derivatives thereof, sulfoxides and derivatives thereof, carbonates, isocyanates, nitrates, acrylates, polyethylenes, polypropylenes, polyesters, polyamides, polyacrylates and polyurethanes; and when $R_1$ and $R_4$ are alkyl and aryl groups, they may be substituted with one or more substituents selected from CN; OH; azides; esters; ethers; amides; halogen atoms; sulfones; sulfonic derivatives; $NH_2$ or $Nalk_2$, where alk is any $C_1$-$C_8$ straight chain alkyl group, $C_3$-$C_8$ branched or cyclic alkyl group;

o and p are each a real number from 0-5000 provided that o+p>0;

m and n are each a real number from 0-10, provided that m+n>0;

r and s are each a real number from 0-5; and $A_1$, $A_2$, $A_3$ and $A_4$ are identical or different photoinitiator moieties.

The indices m, n, o, p, r and s in the general formula I represent an average/sum and the formula I thereby represents alternating, periodic, statistical/random, block and grafted copolymers. As an example of a random copolymer may be mentioned the copolymer ABAAABABBABA having the formula $A_7B_5$.

An example of the identity of formula I applied to a photoinitiator described in the present invention is given in Scheme 1.

$R_2$ and $R_3$ can be selected from any alkylene group having up to 25 carbon atoms and include both branched and straight chain alkylene groups. Exemplary, non-limiting alkylene groups include methylene, ethylene, propylene, butylene, pentylene, hexylene, heptylene, octylene, nonylene, in the normal, secondary, iso and neo attachment isomers. Exemplary, non-limiting cycloalkylene groups include cyclopropylene, cyclobutylene, cyclopentylene and cyclohexylene.

As set out above, the alkylene groups $R_2$ and $R_3$ may be substituted with, apart from the photoinitiator moieties, substituents such as CN, azides, esters, ethers, amides, halogen atoms, sulfones, sulfonic derivatives, $NH_2$ or $Nalk_2$. "alk" is any $C_1$-$C_3$ straight chain alkyl group, $C_3$-$C_8$ branched or cyclic alkyl group. Photoinitiator moieties can be covalently linked to $R_2$ and/or $R_3$ as designated by $R_2(A_2)$ and $R_3(A_3)$, where $A_2$ and $A_3$ can be any of the photoinitiator moieties described herein.

$R_1$ and $R_4$ may independently be at each occurrence identical or different, linear or branched alkyl or cycloalkyl groups. $R_1$ and $R_4$ can be selected from any alkyl group having up to 25 carbon atoms and include both branched and straight chain alkyl groups. Exemplary, non-limiting alkyl groups include methyl, ethyl, propyl, butyl, pentyl, hexyl, heptyl, octyl, nonyl, in the normal, secondary, iso and neo attachment isomers. Exemplary, non-limiting cycloalkyl groups include cyclopropyl, cyclobutyl, cyclopentyl and cyclohexyl.

$R_1$ and $R_4$ can also be selected from aryl groups, such as any aromatic hydrocarbon with up to 20 carbon atoms. Exemplary, non-limiting aryl groups include phenyl, naphthyl, furanyl, thiophenyl, pyrrolyl, selenophenyl, and tellurophenyl. $R_1$ and $R_4$ can also be H, OH, CN, halogens, amines (e.g. —NR'R", where R' and R" are alkyl groups, suitably C1-C25 alkyl groups), amides (e.g. —CONR'R" or R'CONR"—, where R' and R" are alkyl groups, suitably C1-C25 alkyl groups), alcohols, ethers, thioethers, sulfones and derivatives thereof, sulfonic acid and derivatives thereof, sulfoxides and derivatives thereof, carbonates, isocyanates, nitrates, acrylates. Furthermore, $R_1$ and $R_4$ can be selected from polymeric entities such as polyacrylates, polyethylenes, polypropylenes, polyesters, polyamides and polyureathanes. The molecular weight of said polymeric entities is typically in the range of 50-50,000 Da.

In some cases, when $R_1$ and $R_4$ are alkyl and aryl groups, they may be substituted with, apart from the photoinitiator Scheme 1: Example of applying formula I to a photoinitiator. Formula I then reads
$HO(CH_2CH_2O)_6(CH_2CH(CH_2OPhCOPh))_2H$ or $HO(CH_2CH_{1.75}(CH_2OPhCOPh)_{0.25}O)_8H$.

moieties, substituents such as CN, OH, azides, esters, ethers, amides (e.g. —CONR'R" or R'CONR"—, where R' and R" are alkyl groups, suitably C1-C25 alkyl groups), halogen atoms, sulfones, sulfonic derivatives, $NH_2$ or $Nalk_2$, where alk is any C1-C8 straight chain alkyl group, C3-C8 branched or cyclic alkyl group. Photoinitiator moieties can be covalently linked to $R_1$ and/or $R_4$ as designated by $R_1(A_1)$ and $R_4(A_4)$, where $A_1$ and $A_4$ can be any of the photoinitiator moieties described above.

The indices m, n, o, p, r and s are defined as follows:
and p are each a real number from 0-5000 provided that o+p>0;
m and n are each a real number from 0-10, provided that m+n>0;
r and s are each a real number from 0-5.

Suitably, o and p are each from 0-3000, preferably 0-2000. Suitably, o and p are each independently 1 or greater, e.g. 10 or greater. The integers m and n may be from 0-8, preferably 0-5, provided that m+n>0. Suitably, m+n≥1. In a particular aspect, m=1 and/or n=1. When m=1 and n=0, the ratio o:p may be at least 1:1000, preferably at least 1:500.

Typically, r and s are each from 0-4, preferably 0-2. Suitably, r and s are independently 1 or greater, e.g. 1 or 2.

The polyalkylether photoinitiator according to the invention may have a molecular weight between 5 and 10,000 kDa, preferably between 10 kDa and 1,000 kDa, more preferably between 15 kDa and 500 kDa.

The photoinitiator moieties can be selected from 2-hydroxy-2-methyl-propiophenone, benzophenone, thioxanthone, benzil, anthraquinone, camphorquinone, benzoin ether, acylphosphine oxide and silane derivatives but the choice of photoinitiator moieties is not restricted to these classes of compounds. As one example of moieties potentially present in the polymeric photoinitiator is amines (e.g. —NR'R", where R' and R" are alkyl groups, suitably C1-C25 alkyl groups). More details concerning the separate moieties are provided below under the discussion in the detailed disclosure of the invention.

The present invention comprises aspects of coating formation employing the polymeric photoinitiators through UV curing of either polymeric photoinitiator/matrix polymer composition and/or solely of the polymeric photoinitiator. This application extends among other things to paints and lacquers, rubbers and protective coatings.

Ultimately, an aspect of the present invention is to use the polymeric photoinitiator solely in the coating composition eliminating the need for mixing a photoinitiator and a matrix in the coating composition.

DETAILED DISCLOSURE OF THE INVENTION

The present invention provides fabrication and applications of polymeric photoinitiators.
Photoinitiator and Photoinitiator Moieties In the present invention, a photoinitiator is defined as a substance (other than a reactant) which, on absorption of light, generates reactive species (ions or radicals) and initiates one or several chemical reactions or transformation. One preferred property of the photoinitiator is good overlap between the UV light source spectrum and the photoinitiator absorption spectrum. Another desired property is a minor or no overlap between the photoinitiator absorption spectrum and the intrinsic combined absorption spectrum of the other components in the matrix. Good compatibility of the polymeric photoinitiator in the matrix consisting of material to be cured is also a property of interest.

In an embodiment of the polyalkylether photoinitiator according to the invention $A_1$, $A_2$, $A_3$ and $A_4$ are identical or different photoinitiator moieties selected from the group consisting of benzoin ethers, phenyl hydroxyalkyl ketones, phenyl aminoalkyl ketones, benzophenones, thioxanthones, xanthones, acridones, anthraquinones, fluorenones, dibenzosuberones, benzils, benzil ketals, α-dialkoxy-acetophenones, α-hydroxy-alkyl-phenones, α-amino-alkyl-phenones, acyl-phosphine oxides, phenyl ketocoumarins, silane, maleimides, and derivatives thereof. The photoinitiator moieties $A_1$, $A_2$, $A_3$ and $A_4$ can also consist of derivatives of the photoinitiator moieties listed.

In an embodiment of the polyalkylether photoinitiator according to the invention $A_1$, $A_2$, $A_3$ and $A_4$ are identical or different photoinitiator moieties selected from the group consisting of 2-hydroxy-2-methyl-propiophenone, benzophenone, thioxanthone, benzil, anthraquinone, camphorquinone, benzoin ether, acylphosphine oxide, silane, and derivatives thereof. The photoinitiator moieties $A_1$, $A_2$, $A_3$ and $A_4$ can also consist of derivatives of the photoinitiator moieties listed.

In an embodiment of the polyalkylether photoinitiator according to the invention $A_1$, $A_2$, $A_3$ and $A_4$ are identical photoinitiator moieties. However, $A_1$, $A_2$, $A_3$ and $A_4$ may be at least two different photoinitiator moieties.

Suitably, at least one of $A_1$, $A_2$, $A_3$ and $A_4$ is a benzophenone photoinitiator moiety. At least $A_2$ and $A_3$ may be benzophenone photoinitiator moieties.

The photoinitiators of the invention preferably are efficient in transforming light from the UV or visible light source to reactive radicals which can abstract hydrogen atoms and other labile atoms from polymers and hence effect covalent cross-linking. Optionally, amines, thiols and other electron donors can be either covalently linked to the polymeric photoinitiator or added separately or both. Radical photoinitiators can be classified as either cleavable (Norrish type I reaction) or non-cleavable (of which the Norrish type II reaction is a special case, see e.g. A. Gilbert, J. Baggott: "Essentials of Molecular Photochemistry", Blackwell, London, 1991). Upon excitation, cleavable photoinitiators moieties spontaneously break down into two radicals, at least one of which is reactive enough to abstract a hydrogen atom from most substrates. Benzoin ethers (including benzil dialkyl ketals), phenyl hydroxyalkyl ketones and phenyl aminoalkyl ketones are important examples of cleavable photoinitiators moieties. Addition of electron donors is not required but may enhance the overall efficiency of cleavable photoinitiators according to a mechanism similar to that described for the non-cleavable photoinitiators below.

Recently a new class of β-keto ester based photoinitiators has been introduced by M. L. Gould, S. Narayan-Sarathy, T. E. Hammond, and R. B. Fechter from Ashland Specialty Chemical, USA (2005): "Novel Self-Initiating UV-Curable Resins: Generation Three", Proceedings from RadTech Europe 05, Barcelona, Spain, Oct. 18-20, 2005, vol. 1, p. 245-251, Vincentz. After base-catalyzed Michael addition of the ester to polyfunctional acrylates a network is formed with a number of quaternary carbon atoms, each with two neighbouring carbonyl groups. Upon UV or visible light excitation these photoinitiators predominantly cleave by a Norrish type I mechanism and cross-link further without any conventional photoinitiator present, and thick layers may be cured. Such self-initiating systems are within the scope of the present invention.

Excited non-cleavable photoinitiators do not break down to radicals but abstract a hydrogen atom from an organic molecule or, more efficiently, abstract an electron from an electron donor (such as an amine or a thiol). The electron transfer produces a radical anion on the photoinitiator and a radical cation on the electron donor. This is followed by proton transfer from the radical cation to the radical anion to produce two uncharged radicals; of these the radical on the electron donor is sufficiently reactive to abstract a hydrogen atom from most substrates. Benzophenones and related ketones such as thioxanthones, xanthones, anthraquinones, fluorenones, dibenzosuberones, benzils, and phenyl ketocoumarins are important examples of non-cleavable photoinitiators. Most amines with a C—H bond in α-position to the nitrogen atom and many thiols will work as electron donors.

Another self-initiating system based on maleimides has also been identified by C. K. Nguyen, W. Kuang, and C. A. Brady from Albemarle Corporation and Brady Associates LLC, both USA (2003): "Maleimide Reactive Oligomers", Proceedings from RadTech Europe 03, Berlin, Germany, Nov. 3-5, 2003, vol. 1, p. 589-94, Vincentz. Maleimides initiate radical polymerization mainly by acting as non-cleavable photoinitiators and at the same time spontaneously polymerize by radical addition across the maleimide double bond. In addition, the strong UV absorption of the maleimide disappears in the polymer, i.e. maleimide is a photobleaching photoinitiator; this could make it possible to cure thick layers.

A blend of several photoinitiators may exhibit synergistic properties, as is e.g. described by J. P. Fouassier: "Excited-State Reactivity in Radical Polymerization Photoinitiators", Ch. 1, pp. 1-61, in "Radiation curing in Polymer Science and technology", Vol. II ("Photo-initiating Systems"), ed. by J. P. Fouassier and J. F. Rabek, Elsevier, London, 1993. Briefly, efficient energy transfer or electron transfer takes place from one photoinitiator to the other in the pairs [4,4'-bis(dimethylamino)benzophenone+benzophenone], [benzophenone+2, 4,6-trimethyl-benzophenone], [thioxanthone30 methylthiophenyl morpholinoalkyl ketone]. However, many other beneficial combinations may be envisaged. So, in an embodiment of the invention, the photoinitiator moieties include at least two different types of photoinitiator moieties. Preferably the absorbance peaks of the different photoinitiators are at different wavelengths, so the total amount of light absorbed by the system increases. The different photoinitiators may be all cleavable, all non-cleavable, or a mixture of cleavable and non-cleavable.

In an embodiment of the polyalkylether photoinitiator according to the invention at least one of $A_1$, $A_2$, $A_3$ and $A_4$ is a benzophenone photoinitiator moiety.

Furthermore, it has recently been found that covalently linked 2-hydroxy-1-(4-(2-hydroxyethoxyl)phenyl)-2-methylpropan-1-one, which is commercially available with the trade name Irgacure 2959, and benzophenone in the molecule 4-(4-benzoylphenoxyethoxyl)phenyl 2-hydroxy-2-propyl ketone gives considerably higher initiation efficiency of radical polymerization than a simple mixture of the two separate compounds, see S. Kopeinig and R. Liska from Vienna University of Technology, Austria (2005): "Further Covalently Bonded Photoinitiators"; Proceedings from RadTech Europe 05, Barcelona, Spain, Oct. 18-20, 2005, vol. 2, p. 375-81, Vincentz. This shows that different photoinitiators may show significant synergistic effects when they are present in the same oligomer or polymer. Such covalently linked photoinitiators are also applicable within the present invention.

Each and every one of the above-discussed types of photoinitiators and photoinitiator moieties may be utilised as photoinitiator moieties in the polymeric photoinitiators of the present invention.

Polymeric Backbone (Photoinitiator Segment)

The polymeric backbone consists of a polyalkylether segment with the general formula $-(R_2(A_2)_m-O)_o-(R_3(A_3)_n-O)_p-$, wherein $R_2$ and $R_3$ can be selected from any alkylene group having up to 25 carbon atoms and include both branched and straight chain alkylene and cycloalkylene groups. Exemplary, non-limiting alkylene groups include methylene, ethylene, propylene, butylene, pentylene, hexylene, heptylene, octylene, nonylene, in the normal, secondary, iso and neo attachment isomers. Exemplary, non-limiting cycloalkylene groups include cyclopropylene, cyclobutylene, cyclopentylene and cyclohexylene.

In an embodiment of the polyalkylether photoinitiator according to the invention, $R_2$ and $R_3$ are independently $-CH_2CH_2-$ in which one or more H atoms may be replaced by $A_2$ or $A_3$, respectively.

In an embodiment of the polyalkylether photoinitiator according to the invention $R_2$ and $R_3$ are independently $-CH(CH_3)CH_2-$ in which one or more H atoms may be replaced by $A_2$ or $A_3$, respectively.

In some cases the alkylene groups may, apart from the photoinitiator moieties, bear substituents such as CN, azides, esters, ethers, amides (e.g. —CONR'R" or R'CONR"—, where R' and R" are alkyl groups, suitably C1-C25 alkyl groups), halogen atoms, sulfones, sulfonic derivatives, $NH_2$ or $Nalk_2$, where alk is any C1-C8 straight chain alkyl group, C3-C8 branched or cyclic alkyl group. Photoinitiator moieties can be covalently linked to $R_2$ and/or $R_3$ as designated by $R_2(A_2)_m$ and $R_3(A_3)_n$, where $A_2$ and $A_3$ can be any of the photoinitiator moieties described above. The indices m, n, o and p are as set out above.

Curing

The ultraviolet spectrum is divided into A, B and C segments where UV A extend from 400 nm down to 315 nm, UV B from 315 to 280 nm, and UV C from 280 to 100 nm. By using a light source that generates light with wavelengths in the visible region (400 to 800 nm) some advantages are obtained with respect to the depth of the curing, provided that the photoinitiator can successfully cure the material at these wavelengths. In particular, scattering phenomena are less pronounced at longer wavelength, thus giving a larger penetration depth in the material. Thus photoinitiators which absorb, and can induce curing, at longer wavelength are of interest. By judicially choosing substituents on the phenone moieties, the absorption spectrum of the polymeric photoinitiator can to some extent be red-shifted, which would then facilitate curing at comparatively greater depths.

One class of compounds that absorbs light in the visible region is titanocenes. As an example bis-pentafluorophenyl titanocene is known to absorb up to ~530 nm (K. Meier, *Coordination Chemistry Reviews*, 111 (1991), 97-110). This particular compound is also known to be stable up to 230° C. and is insensitive to acid treatment. A commercially available titanocene is available under the trade name Irgacure 784.

In the curing process, the photoinitiator cross-links or otherwise transforms a surrounding polymer composition, hereafter referred to as a matrix, in a chemical process induced by light. The present invention therefore relates to the use of a polyalkylether photoinitiator according to the invention for curing a matrix composition.

In addition, the invention provides a method for curing a matrix composition, said method comprising the steps of:
a. mixing the polyalkylether photoinitiator above with a matrix composition;
b. curing the mixture obtained in step a. by exposing it to UV radiation.

The present invention also relates to a matrix composition obtainable via the method described herein.

The polymeric photoinitiators described here can facilitate curing of a surrounding matrix, but since the photoinitiators themselves are polymers they can also "auto-cure", meaning that the polymeric photoinitiators can solely constitute a coating composition that is cured upon UV irradiation. As such the pristine polymeric photoinitiator can be cured to form a cross-linked network, or the polymeric photoinitiator can be a constituent in a mixture which is subsequently cured to form a cross-linked network.

Polymeric Photoinitiators of the Invention
Polyethylene Oxide Derived Photoinitiators.

The polymeric photoinitiators can be either synthesized by a polymerization reaction or grafted onto a polymeric backbone. A general scheme for a direct synthesis of a polymeric photoinitiator with pendant photoinitiator moieties based on epoxy-ring opening is shown in Scheme 2, where the symbols from the general formula for the polymeric photoinitiators are exemplified.

Scheme 2: General method of preparing random copolymers of epoxide functionalized photoinitiators with substituted epoxides. The solid dotted line represents that under specific reaction conditions, this position is primarily substituted with the photoinitiator system. Other reactions might result mainly in substitution at the position labelled with a dashed line.

$m = 1$

The epoxide functionality used for the polymerization is obtained through a reaction with epichlorohydrine, but might also be obtained through a reaction with an allyl-derivative which is then subsequently oxidized with an oxidizing agent such as m-chloro-perbenzoic acid or hydrogen peroxide.

As illustrated in Scheme 2, attack of a nucleophile, either the initiator or an alkoxide ion, occurs at the least substituted carbon atom on the epoxide present on the spacer group. Some reaction conditions, e.g. acidic conditions might favor the converse meaning that the most substituted carbon atom on the epoxide is attacked by the nucleophile. For simplicity, only polymerizations resulting in attack of the least substituted carbon atom in the photoinitiator attached epoxide, is illustrated in the following, but the invention is not so limited.

With respect to substituents, $R'_1$, $R'_2$, $R'_3$ and $R'_4$ can be selected from any alkyl groups having up to 25 carbon atoms and includes both branched, cyclic and straight chain alkyl groups. Exemplary alkyl groups include methyl, ethyl, propyl, butyl, pentyl, hexyl, heptyl, octyl, nonyl, in the normal, secondary, iso and neo attachment isomers. $R'_1$, $R'_2$, $R'_3$ and $R'_4$ can also be selected from aryl groups, such as any aromatic hydrocarbon with up to 20 carbon atoms. Exemplary aryl groups include phenyl, naphthyl, furanyl, thiophenyl, pyrrolyl, selenophenyl, and tellurophenyl. In some cases the alkyl and aryl groups may bear substituents such as CN, azides, esters, ethers, amides (e.g. —CONR'R" or R'CONR"—, where R' and R" are alkyl groups, suitably C1-C25 alkyl groups), halogen atoms, sulfones, sulfonic derivatives, $NH_2$ or $Nalk_2$, where alk is any C1-C8 straight chain alkyl group, C3-C8 branched or cyclic alkyl group. $R'_1$, $R'_2$, $R'_3$ and $R'_4$ may also be H.

The spacer group, if any, may be selected from the same functional groups as $R'_1$, $R'_2$, $R'_3$ and $R'_4$ and additionally from groups mainly consisting of alkylethers, such as —$(CH_2CH_2O)_t$—, where t can be any integer from 0-100.

In an embodiment of the polyalkylether photoinitiator according to the invention $R_1$=OH.

In an embodiment of the polyalkylether photoinitiator according to the invention $R_4$=H.

As a first example, a polymerization of 2-hydroxy-2-methyl-1-(4-(2-(oxiran-2-ylmethoxy)ethoxy)phenyl)propan-1-one (3) with either itself or ethylene oxide results in a (co)-polymer which is a polymeric photoinitiator (Scheme 3). The precursor for the synthesis of this polymer is 2-hydroxy-1-(4-(2-hydroxyethoxy)phenyl)-2-methylpropan-1-one (Irgacure 2959). A synthesis of (3) is outlined in U.S. Pat. No. 5,744,512.

Scheme 3: Preparation of polymeric photoinitiator from Irgacure 2959.

An alternate route to analogues of (3) is illustrated in Scheme 4, where the hydroxyalkyl phenone is formed in a Friedel-Crafts reaction with isobutyryl chloride as described in U.S. Pat. No. 5,744,512.

Scheme 4: Preparation of analogues of (3).

The synthesis of Irgacure 2959 has previously been described elsewhere (German Offenlegungsschrift 3.512.179). The attachment of photoinitiators with similar structure as Irgacure 2959 onto a polyalkylether is the main focus of the present invention. Following the synthetic route in Scheme 4, it will be possible to place specific substituents on the benzene ring by methods generally known in the art.

Derivatives of Irgacure 2959 are characterized as Type I photoinitiators, and other photoinitiators that fall in this category are benzoinethers, benzil ketals, α-dialkoxy-acetophenones, α-hydroxy-alkyl-phenones, α-amino-alkyl-phenones and acyl-phosphine oxides. A further example of a polymeric photoinitiator based on a benzoinether is illustrated in Scheme 5.

Scheme 5: Preparation of an epoxide substituted benzoinether, which is polymerized with a substituted epoxide.

X=O,S,NMe

The preparation of the polymeric photoinitiator shown in Scheme 6, follows the same principles as shown in Schemes 3-5, where a hydroxy functionality present on the photoinitiator is reacted with epichlorhydrin. The resulting compound is then co-polymerized with a substituted epoxide thus resulting in the polymeric photoinitiator. Preparation of various substituted xanthone, thioxanthone and acridone molecules are detailed in J. Zhao, R. C. Larock *J. Org. Chem.* 72 (2007), 583-588. $R''_1$ and $R''_2$ may be selected from the same set of functional groups as $R'_1$, $R'_2$, $R'_3$ and $R'_4$.

As another example of a type II polymeric photoinitiator, a benzophenone substituted polyethylene oxide is illustrated in Scheme 7.

Depicted in Schemes 3-5 are examples of Type I photoinitiators attached to a polyalkylether backbone and an example of the preparation of a Type II polymeric photoinitiator is shown in Scheme 6 with xanthones, thioxanthones and acridones as the photoinitiator moiety itself.

Scheme 6: Preparation of xanthone, thioxhanthone and acridone substituted polymeric photoiniators.

Scheme 7: Synthesis of a benzophenone substituted polyethylene oxide.

Synthesis of the epoxide derivatized benzophenone has been described for other analogues than the pure benzophenone in U.S. Pat. No. 4,376,788. No details were given for the intermediate in Scheme 7. The epoxide can subsequently be polymerized into the polyethylene oxide substituted benzophenone.

An alternate route to derivatized polyethylene oxide could be via grafting techniques as exemplified in Scheme 8.

Scheme 8: Grafting of a peroxy benzophenone ester onto polyethylene oxide.

Grafting of the peroxy ester is catalysed by copper(I) as described in J. March: "Advanced Organic Chemistry. Reaction, Mechanisms, and Structure", 3. ed., p. 636-7, Wiley-Interscience, New York, 1985). The specific example shown in Scheme 8 is also disclosed in WO2008071796.

Polyalkyl Oxide Derived Photoinitiators.

A general scheme for preparation of polyalkyl oxide derived photoinitiators is shown in Scheme 9, where the polymer is synthesized through an acyclic diene polymerization (ADMET) reaction.

Scheme 9: ADMET polymerization of dienes and subsequent hydrogenation for forming a polyalkyl ether based photoiniator.

m', n', o', m", n", o", p' and q' can be any integers 0-10000

Such polymerization types have been described in K. B. Wagener, K. Brzezinska *Macromolecules,* 24 (1991), 5273-5277.

Considerable research has been focused on polymerizing substituted oxiranes, with different initiators and different solvents. Thus (4-(oxiran-2-ylmethoxy)phenyl)(phenyl)methanone can most likely be polymerized with e.g. potassium t-butoxide as an initiator in a anionic polymerization scheme as done in P. Yang, X. Zhu, Y. Yo, Y. M. Xia and T. Li *Jour. Appl. Polym. Sci.* 113 (2009), 3656-3660. Reaction conditions for similar polymerizations with a variety of other nucleophiles such as potassium hydroxide as initiators are presented in J. Cao, N.-F. Yang, P.-D. Wang and L.-W. Yang *Polymer International,* 57 (2008), 530-537. Several reaction conditions are published in patent literature as well, where in U.S. Pat. No. 4,472,560 metal cyanide complexes are used as catalysts for the epoxide polymerization. Organoaluminium catalysts are also described in U.S. Pat. No. 4,009,128 to work well in a cationic polymerization scheme.

EXAMPLE 1

Synthesis of (4-(oxiran-2-ylmethoxy)phenyl)(phenyl)methanone

A solution of 4-hydroxy-benzophenone (15.02 g, 75.78 mmol) was dissolved in ethanol (75 mL) and NaOMe (4.11 g, 76.09 mmol) in methanol (75 mL) was added. The reaction mixture was stirred for 20 min. at room temperature and then concentrated by evaporation on a rotavapor. The residue was dissolved in dimethylformamide (150 mL) and epichlorohydrin (10.73 g, 116 mmol) was added. After stirring for 4 hours at 110° C. and a crude product was obtained by adding activated charcoal, filtering and removal of the solvent. The crude product was recrystallized from ethanol leaving a white compound (12 g) in 62% yield. $^1$H-NMR (CDCl$_3$, RT, 300 MHz): 7.81 (d, 2H, J=9 Hz), 7.74 (d, 2H, J=7 Hz), 7.55 (t, 1H, J=8 Hz), 7.45 (t, 2H, J=7 Hz), 6.97 (d, 2H, J=9 Hz), 4.32 (dd, 1H, J$_1$=11 Hz, J$_2$=3 Hz), 3.99 (dd, 1H, J$_1$=11 Hz, J$_2$=6 Hz), 3.37 (m, 1H), 2.91 (t, 1H, J=5 Hz), 2.76 (dd, 1H, J$_1$=5 Hz, J$_2$=3 Hz); $^{13}$C-NMR (CDCl$_3$, RT, 75 MHz): 195.4, 161.9, 138.0, 132.4, 131.9, 130.5, 129.6, 128.1, 114.1, 68.8, 49.8, 44.5.

Polymerization Example 1

Synthesis of poly-co-ethyleneoxide-(4-(oxiran-2-ylmethoxy)phenyl)(phenyl)methanone Prior to the polymerization, (4-(oxiran-2 ylmethoxy)phenyl)(phenyl)methanone was carefully dried under vacuum and then transferred into a dry round bottom flask under nitrogen. The initiator for the polymerization was prepared by condensing dry THF into a round bottom flask. Naphthalene and potassium were dissolved under argon atmosphere and the solution was stirred for one day giving a dark green solution. Biphenyl methane was added and the resulting solution stirred for three days giving a deep red initiator solution.

The glassware used for the polymerization was dried thoroughly and assembled in a nitrogen glove box. When attached to the synthesis setup the glassware was flushed with argon several times prior to use. The ethylene oxide was condensed from a pressured can into a round bottom flask and dried intensively.

(4-(oxiran-2 ylmethoxy)phenyl)(phenyl)methanone (0.8 g, 3 mmol) was weighed into a reaction flask under nitrogen and the flask was dried over sodium-potassium alloy for at least 24 hours. THF (250 mL) was condensed into a reaction flask followed by ethylene oxide (11.1 g, 0.252 mol). Afterwards the initiator solution was added with an argon rinsed syringe. The reaction flask was set into a 60° C. thermostated water bath for 3-5 days. If a precipitate had formed during the reaction it was filtered from the reaction solution. The reaction solution was concentrated by taking off a part of the reaction solvent by reduced pressure. The polymer (1) was precipitated from cold diethyl ether and dried at 40° C. for at least 24 hours. Yield: 32 wt %. MW 34000, PD 1.5 (as determined by GPC). $^1$H-NMR (CDCl$_3$, 300 K, 500 MHz): 7.85-7.79 (m, 2H), 7.78-7.73 (m, 2H), 7.61-7.53 (m, 1H), 7.51-7.43 (m, 2H), 7.02-6.95 (m, 2H), 4.24-4.18 (m, 2H), 3.93-3.82 (m, 4H), 3.80-3.35 (m, 243H). The ratio of benzophenone to ethylene oxide is thus ~1:61.

Polymerization Example 2

Synthesis of poly-co-ethyleneoxid-(4-(oxiran-2-ylmethoxy)phenyl)(phenyl)methanone The bench-scale polymerizations were carried out in a 250 ml glass reactor by using tri-isobutylaluminium and potassium t-butoxide as the catalyst system (see the used standard polymerization conditions in the following table).

| Parameter | Value |
| --- | --- |
| Process type | Slurry |
| Solvent | Toluene |
| Monomer | Ethylene oxide, 4-(oxiran-2-ylmethoxy)phenyl)(phenyl)methanone |
| Monomer feed type | Stepwise, by volume |
| Temperature (° C.) | 20 |
| Total Pressure (bar) | 0.3-0.8 |

The catalyst synthesis and polymerizations of ethylene oxide were done by using a procedure in EP1566397.

A 250 ml glass reactor was used.

Work was done in every step under inert conditions under a nitrogen atmosphere; the final polymer is also stored under nitrogen (which has not been in contact with air/water).

The addition of ethylene oxide was done by using a 100 ml sight-glass by using liquid ethylene oxide (under pressure).

The final polymer was washed with hexane, filtered and dried under reduced pressure at room temperature.

A polymerization was performed using toluene (60 mL), potassium t-butoxide (56 mg), triisobutyl aluminium (1 M in hexane, 1.4 mL), ethylene gas (26 g) and 4-(oxiran-2-ylmethoxy)phenyl)(phenyl)methanone (1.3 g). The yield of the reaction was 9.1 g of the target polymer (2). $^1$H-NMR (CDCl$_3$, 300 K, 300 MHz): 7.94-6.64 (m, 9H), 4.30-3.00 (m, 121H). The ratio of benzophenone to ethylene oxide is thus ~1:29.

Curing Example

Curing of poly-co-ethyleneoxid-(4-(oxiran-2-ylmethoxy)phenyl)(phenyl)methanone from example 1

Figure 4:
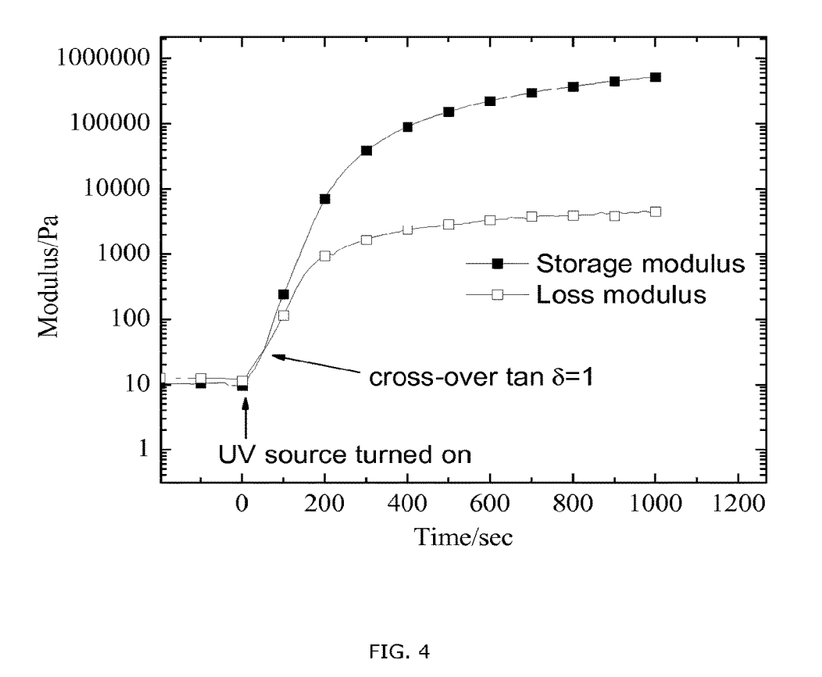
FIG. 4 shows the curing profile for pristine poly-co-ethyleneoxid-(4-(oxiran-2-ylmethoxy)phenyl)(phenyl) methanone (1) at 120° C.

An oblate of pristine poly-co-ethyleneoxid-(4-(oxiran-2 ylmethoxy)phenyl)(phenyl) methanone (1) was placed between the two plates in a rheometer (parallel plate configuration, bottom plate is a quartz glass plate). The distance between the plates was set to 0.3 mm and the temperature to 120° C. The measurements were run with fixed strain of 1% and a constant frequency of 1 Hz. When the loss and storage modules had stabilized, a UV-lamp was turned on, thus irradiating the sample through the bottom plate on the rheometer via a fibre from the lamp. The loss and storage modules were then followed as a function of time, while the UV-lamp irradiated the sample. An illustrative result of such a measurement is shown in FIG. 4.

The comparatively low moduli prior to irradiation with UV light indicate a low viscosity in accordance with a fairly low molecular weight of the polymer of ~20 kDa. However, the loss modulus is larger than the storage modulus showing liquid behaviour of the melt. When the UV source is turned on, the moduli increase, suggesting that cross-linking reactions are initiated which forms a covalently-bonded network of polyethylene oxide chains. Eventually, the storage modulus becomes larger than the loss modulus showing that a solid or gel has formed as a result of the curing reaction. As a visual inspection, the cross-linked polyethylene oxide oblate was placed in water which resulted in a swelled gel.

Curing Example

Curing of poly-co-ethyleneoxid-(4-(oxiran-2-ylmethoxy)phenyl)(phenyl)methanone from example 2

Figure 5:
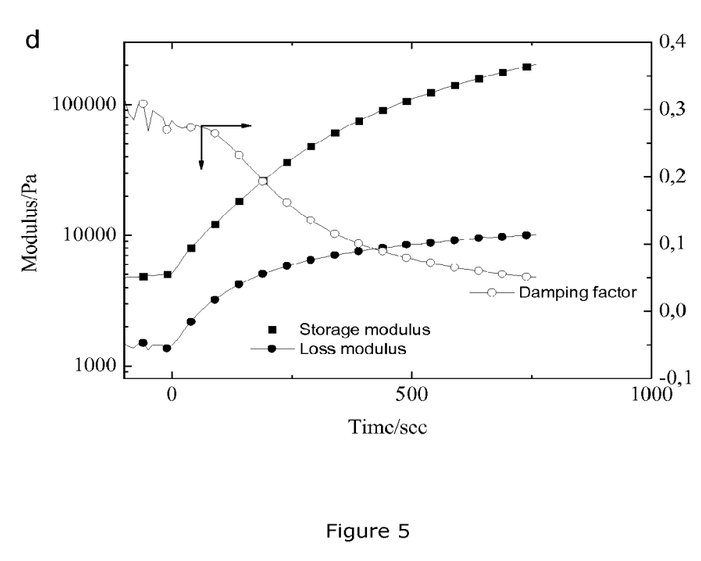
FIG. 5 shows the curing profile for pristine poly-co-ethyleneoxid-(4-(oxiran-2-ylmethoxy)phenyl)(phenyl) methanone (2) at 120° C.

An oblate of pristine poly-co-ethyleneoxid-(4-(oxiran-2 ylmethoxy)phenyl)(phenyl)methanone (2) was placed between the two plates in a rheometer (parallel plate configuration, bottom plate is a quartz glass plate). The distance between the plates was set to 0.3 mm and the temperature to 120° C. The measurements were run with fixed strain of 1% and a constant frequency of 1 Hz. When the loss and storage modules had stabilized, a UV-lamp was turned on, thus irradiating the sample through the bottom plate on the rheometer via a fibre from the lamp. The loss and storage modules were then followed as a function of time, while the UV-lamp irradiated the sample. An illustrative result of such a measurement is shown in FIG. 5.

As seen from FIG. 4, the polymer indeed responds to UV irradiation, however, the initial values of the modulus indicates a solid (damping factor is lower than one). Upon exposure to UV irradiation the sample shows an increase in both storage and loss modulus indicating that cross-linking is taking place.

The invention claimed is:

1. A polyalkylether photoinitiator of the general formula I wherein $R_1$ is a linear or branched alkyl or cycloalkyl group or aryl group or is selected from H, OH, CN, halogens, amines, amides, alcohols, ethers, thioethers, sulfones and derivatives thereof, sulfonic acid and derivatives thereof, sulfoxides and derivatives thereof, carbonates, isocyanates, nitrates, acrylates, polyethylenes, polypropylenes, polyesters, polyamides, polyacrylates and polyurethanes;

$R_2$ and $R_3$ are independently at each occurrence different, linear or branched alkylene or cycloalkylene groups; wherein $R_2$ and $R_3$ may be substituted with one or more substituents selected from CN; azides; esters; ethers; amides; halogen atoms; sulfones; sulfonic derivatives; $NH_2$ or $Nalk_2$, where alk is any $C_1$-$C_8$ straight chain alkyl group, $C_3$-$C_8$ branched or cyclic alkyl group;

$R_4$ is a linear or branched alkyl or cycloalkyl group or aryl group or is selected from alcohols, sulfoxides and derivatives thereof, carbonates, isocyanates, nitrates, acrylates, polyethylenes, polypropylenes, polyesters, polyamides, polyacrylates and polyurethanes; and when $R_1$ and $R_4$ are alkyl and aryl groups, each of $R_1$ or $R_4$ may be substituted with one or more substituents selected from CN; OH; azides; esters; amides; halogen atoms; sulfones; sulfonic derivatives; $NH_2$ or $Nalk_2$, where alk is any $C_1$-$C_8$ straight chain alkyl group, $C_3$-$C_8$ branched or cyclic alkyl group;

o and p are each a real number from 1-5000;

m and n are each a real number from 1-10;

r and s are each a real number from 1-5;

t is an integer from 1-100; and $A_1$, $A_2$, $A_3$ and $A_4$ are identical or different photoinitiator moieties.

2. The polyalkylether photoinitiator according to claim 1, wherein $A_1$, $A_2$, $A_3$ and $A_4$ are linked to $R_1$, $R_2$, $R_3$, and $R_4$, respectively, via a spacer group.

3. The polyalkylether photoinitiator according to claim 2, wherein the spacer group is selected from the group consisting of alkylene, cycloalkylene, aryl, and alkylene ether groups.

4. The polyalkylether photoinitiator according to claim 1, wherein $R_2$ is —$CH_2CH_2$—, in which one or more H atoms may be replaced by $A_2$.

5. The polyalkylether photoinitiator according to claim 1, wherein $R_3$ is —$CH(CH_3)CH_2$—, in which one or more H atoms may be replaced by $A_3$.

6. The polyalkylether photoinitiator according to claim 1, wherein $R_1$ is OH.

7. The polyalkylether photoinitiator according to claim 1, wherein $R_4$ is a linear or branched alkyl group.

8. The polyalkylether photoinitiator according to claim 1, wherein $A_1$, $A_2$, $A_3$ and $A_4$ are identical or different photoinitiator moieties selected from the group consisting of benzoin ethers, phenyl hydroxyalkyl ketones, phenyl aminoalkyl ketones, benzophenones, thioxanthones, xanthones, acridones, anthraquinones, fluorenones, dibenzosuberones, benzils, benzil ketals, α-dialkoxy-acetophenones, α-hydroxy-alkyl-phenones, α-amino-alkyl-phenones, acyl-phosphine oxides, phenyl ketocoumarins, silane, maleimides, and derivatives thereof.

9. The polyalkylether photoinitiator according to claim 8, wherein $A_1$, $A_2$, $A_3$ and $A_4$ are identical or different photoinitiator moieties selected from the group consisting of 2-hydroxy-2-methyl-propiophenone, benzophenone, thioxanthone, benzil, anthraquionone, camphorquinone, benzoin ether, acylphosphine oxide, silane, and derivatives thereof.

10. The polyalkylether photoinitiator according to claim 9, wherein $A_1$, $A_2$, $A_3$ and $A_4$ are identical photoinitiator moieties.

11. The polyalkylether photoinitiator according to claim 10, wherein at least one of $A_1$, $A_2$, $A_3$ and $A_4$ is a benzophenone photoinitiator moiety.

12. The polyalkylether photoinitiator according to claim 11, wherein at least $A_2$ and $A_3$ are benzophenone photoinitiator moieties.

13. The polyalkylether photoinitiator according to claim 1, wherein $A_1$, $A_2$, $A_3$ and $A_4$ are at least two different photoinitiator moieties.

14. The polyalkylether photoinitiator according to claim 1, wherein o and p are each from 1-3000.

15. The polyalkylether photoinitiator according to claim 1, wherein m and n are each an integer from 1-8.

16. The polyalkylether photoinitiator according to claim 1, wherein m is 1 and n is 1.

17. The polyalkylether photoinitiator according to claim 1, wherein r and s are each from 1-4.

18. The polyalkylether photoinitiator according to claim 1, having a molecular weight between 5 kDa and 10,000 kDa.

19. A method for curing a matrix composition, said method comprising the steps of:
a) mixing the polyalkylether photoinitiator according to claim 1 with a matrix composition;
b) curing the mixture obtained in step a) by exposing it to UV radiation.

20. A matrix composition obtained via the method of claim 19.

* * * * *